United States Patent [19]
Johnson et al.

[11] Patent Number: 5,155,760
[45] Date of Patent: Oct. 13, 1992

[54] VOICE MESSAGING SYSTEM WITH VOICE ACTIVATED PROMPT INTERRUPT

[75] Inventors: Mark A. Johnson, Wheaton; Stephen A. O'Brien; Bradley T. Wyman, both of Naperville, all of Ill.

[73] Assignee: AT&T Bell Laboratories, Murray Hill, N.J.

[21] Appl. No.: 721,029

[22] Filed: Jun. 26, 1991

[51] Int. Cl.⁵ .................... H04M 1/64; H04M 9/08; H04J 3/04
[52] U.S. Cl. ........................ 379/67; 379/88; 379/410; 370/110.1
[58] Field of Search ............ 379/410, 67, 88; 370/110.1

[56] References Cited

U.S. PATENT DOCUMENTS

| | | | |
|---|---|---|---|
| 4,592,048 | 5/1986 | Beckner et al. | 370/60 |
| 4,602,129 | 7/1986 | Matthews et al. | 379/89 |
| 4,612,416 | 9/1986 | Emerson et al. | 179/6.11 |
| 4,646,346 | 2/1987 | Emerson et al. | 379/89 |
| 4,790,003 | 12/1988 | Kepley et al. | 379/88 |
| 4,914,692 | 4/1990 | Hartwell et al. | 379/410 |

OTHER PUBLICATIONS

"Prompt Cancellation in Automated Operator Services", Cathleen R. Shamieh, Speech Tech'91—Voice Input/Output Applications Conference and Exhibition—Apr. 23, 24, 25, 1991, pp. 77-82.

"No. 5 ESS®—Versatile, Flexible, Forward Looking", T. E. Browne, J. C. Ewin, and G. P. O'Reilly, Bell Laboratories Record, Nov. 1981, p. 258.

"No. 5 ESS®—Serving the Present, Serving the Future", J. W. Johnson, J. C. Kennedy, and J. C. Warner, Bell Laboratories Record, Dec. 1981, p. 290.

"The 5ESS® Switching System", K. E. Martersteck, and A. E. Spencer, Jr., AT&T Technical Journal, vol. 64, No. 6, Jul.-Aug. 1985, pp. 1303-1564.

Primary Examiner—James L. Dwyer
Assistant Examiner—Fan Tsang
Attorney, Agent, or Firm—M. B. Johannesen

[57] ABSTRACT

An arrangement providing voice activated prompt interrupt for a voice messaging system. The exemplary apparatus includes a telephone line interface, a memory device, a processor, a prompting device and a recording device. Once a call is established at the interface, the processor causes the prompt to be played and simultaneously the incoming signal to be sampled. An echo estimate is determined, subtracted from the incoming signal and a determination is made if incoming speech is detected. If incoming speech is detected, the prompt is stopped and the buffered incoming signal is directed to the recording device.

31 Claims, 5 Drawing Sheets

VOICE MESSAGING SYSTEM WITH VOICE ACTIVATED PROMPT INTERRUPT

TECHNICAL FIELD

This invention relates to voice messaging systems, such as voice mail systems and answering machines.

BACKGROUND OF THE INVENTION

As telecommunications become increasingly important in everyday life, people are relying more and more on voice messaging systems. Voice messaging systems can be a large system adjunct to a PBX or switching system or a simple telephone answering machine. Voice messaging systems, both large and small, generally comprise a telephone line interface, an announcement or prompt mechanism and a recording/retrieval device, all of which are controlled by a processor. These systems answer the telephone after a predetermined number of rings. In more sophisticated systems, the voice messaging system answers when the called party is busy on another call. In either case, the system then prompts the calling party and records a message.

As common as voice messaging system are, however, many calling parties do not wait until the prompt is finished before beginning to speak. Many messages are lost or are incomplete because the calling party did not "wait for the tone" before speaking. The calling parties "barge in" as if the prompt were a human speaker that could be interrupted. Also, many callers are impatient over having to listen to a sometimes lengthy prompt before being able to record their messages. Therefore, a problem in the art is that calling parties often attempt to record a message without waiting for the end of the prompt.

Some voice messaging systems provide a feature whereby the calling party may interrupt the prompt by entering a code using dual-tone, multifrequency buttons (DTMF) on a push button phone. However, the caller must know the code for the particular voice messaging system, which is usually different for each system. As a result, few callers use DTMF barge in to interrupt a prompt message.

One system from a related field that provides prompt interrupt or "barge in" is described in U.S. Pat. No. 4,914,692, issued to Hartwell et al. on Apr. 3, 1990, and assigned to the assignee of this application. Hartwell describes a customer inquiry unit that initially responds to a telephone call received via the telephone network by transmitting an outgoing speech message to the customer. A portion of the speech of the message is reflected back to the inquiry system, due to the nature of the network. This is commonly called "echo". Hartwell discloses an echo canceler which adapts to the telephone network during an initial time period of the outgoing speech message and removes the echo of the outgoing speech message from the incoming signal. In case the customer starts to speak before the initial message is finished, the echo canceler transfers the enhanced incoming speech to a speech recognition subsystem for recognizing the content of the incoming speech.

The system of the Hartwell patent is described in connection specifically with complex speech recognition systems. Hartwell does not disclose how a typical simple answering machine or voice mail system may use echo cancellation to provide "barge in" for voice storage. Importantly, Hartwell does not disclose or discuss how to save the initial syllables of the incoming speech that would normally be lost due to the time-lag between detection of the incoming speech and activation of a recording device.

A problem in the art is that there is no voice messaging system with a voice activated prompt interrupt that will record an incoming message without losing the first part of the message.

SUMMARY OF THE INVENTION

This problem is solved and a technical advance is achieved in accordance with the principles of the invention, in exemplary embodiments that provide voice-activated prompt interrupt for voice messaging systems, where in response to the receipt of call, a system responds by transmitting a prompt message to the network, monitoring incoming speech signals during the transmission of the prompt, determining whether the energy of the incoming speech signals exceeds a predefined threshold and taking further action in response to determining that the energy of the incoming speech signals exceeds the predefined threshold. Advantageously, the further action taken may comprise recording the incoming speech signal, either in analog or digital form. Additionally, the incoming speech signals may be enhanced by an echo canceler that monitors both the prompt message and the incoming speech signal, determines an echo estimate of the echo of the prompt message and substracts the echo estimate from the incoming speech signal. The enhanced incoming speech signal is then recorded.

In a first exemplary embodiment (FIG. 4), a telephone answering machine is connected to a telephone network by a telephone network interface. A prompt device that transmits a prompt message to the telephone network is connected to the interface and to a signal enhancement device. The signal enhancement device is also connected to the interface to receive incoming signals. The signal enhancement device advantageously develops an enhanced incoming signal, which is delivered to a speech detection device, which detects if the enhanced incoming signal includes speech. If the enhanced incoming signal includes speech, the enhanced incoming signal is delivered to a recording device. Advantageously, a buffer between the signal enhancement device and the recording device receives the enhanced incoming signal so that when speech is detected, the content of the buffer is sent to the recording device, and no speech is lost during the time that is required to recognize speech.

In a second exemplary embodiment (FIG. 5), a voice mail system is connected to a multiline hunt group from a switch at a network interface. A prompt device that transmits a prompt message to the telephone network is connected to the interface and to a signal enhancement device. The signal enhancement device is also connected to the interface to receive incoming signals. The signal enhancement device advantageously develops an enhanced incoming signal, which is delivered to a speech detection device, to detect whether the enhanced incoming signal includes speech. If the enhanced incoming signal includes speech, the enhanced incoming signal is delivered to a recording device. Advantageously, a buffer between the signal enhancement device and the recording device receives the enhanced incoming signal so that when speech is detected, the content of the buffer is sent to the recording device, and no speech is lost during the time that is required to recognize speech.

In a third exemplary embodiment (FIG. 6), an ISDN telephone station set is connected to an ISDN switching system via a digital subscriber line comprising first and second B-channels and a D-channel. A splitter/combiner digitally interfaces the first and second B-channels and the D-channel of the digital subscriber line with a first B-channel path, a second B-channel path and a D-channel path, respectively. A first coder/decoder converts between digital voice signals received from the first B-channel via the splitter/combiner and analog voice signals, and a second coder/decoder converts between digital voice signals received from the second B-channel via the splitter/combiner and analog voice signals. A recording device is connectable to either the first or second B-channel for recording voice messages. A prompt device is connected to the splitter/combiner for transmitting an outgoing prompt message to the network on either the first or second B-channel. A signal enchancing device is connected to the first and second B-channel and the prompt device for receiving incoming signals and the outgoing prompt signal and developing an enhanced incoming signal. The enhanced incoming signal is delivered to a speech detection device and to a buffer. When the speech detection device detects speech in the enhanced incoming signal, the buffer is connected to the recording device and the enhanced incoming signal is transferred from the buffer to the recording device.

DETAILED DESCRIPTION

Figure 1:
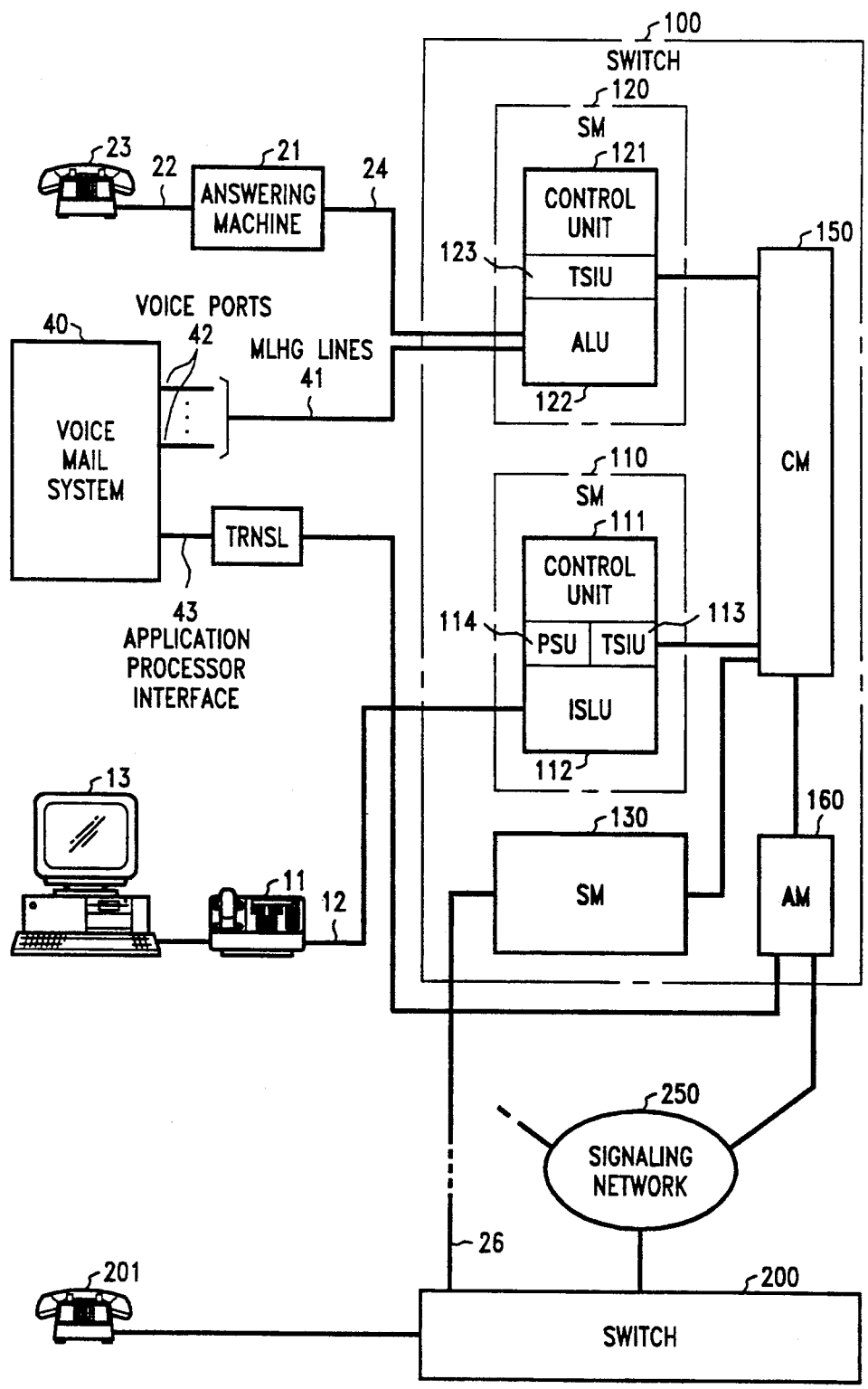
FIG. 1 is a block diagram of a switching network configuration including three exemplary embodiments of voice messaging systems and illustrating connections to the network in accordance with the invention.

An exemplary voice messaging system with a voice activated prompt interrupt is described herein in the context of the switching network configuration of FIG. 1, having two central office switches, 100 and 200, an inter-switch signaling network 250, e.g., a common channel signaling (CCS7) network and illustrative communication stations including conventional analog stations 23 and 201, an integrated services digital network (ISDN) station 11 and an answering machine 21. Switches 100 and 200 are interconnected by a communication path 26, which may include intermediate switches.

Illustratively, switch 100 is a distributed control, ISDN switching system such as the system disclosed in U.S. Pat. No. 4,592,048, issued to M. W. Beckner et al., on May 27, 1986. Alternatively, switch 100 may be a distributed control, analog or digital switch, such as a 5ESS® switch as described in the AT&T Technical Journal, v. 64, no. 6, July/August 1985, pp. 1303–1564, the November, 1981, Bell Laboratories Record, page 258, and the December, 1981, Bell Laboratories Record, page 290, and manufactured by AT&T. This invention will be described in connection with an ISDN switch so that embodiments including an ISDN telephone station set incorporating this invention and an answering machine using analog lines incorporating this invention may be described.

An integrated services digital network (ISDN) is a network that provides end-to-end digital connectivity to support a wide range of services, including voice and non-voice services, to which users have access by a limited set of standard multipurpose customer interfaces. Switch 100 includes a number of switching modules (SMs), each associated with a different subset of stations or trunks. Each switching module includes a control unit for controlling connections to and from its associated station or trunks. Switching module 110, for example, includes control unit 111 for controlling connections to and from station 11. Similarly, switching module 120 includes control unit 121 for controlling connections to and from telephone station set 23.

The architecture of switch 100 has communication module (CM) 150 as a hub, with the switching modules (SMs) 110, 120, and 130, and an administrative module (AM) 160 emanating therefrom. Switching module 110 includes an integrated services line unit (ISLU) 112, which terminates the digital subscriber lines, e.g., 12, and provides access to a time slot interchange unit (TSIU) 113 and a packet switching unit (PSU) 114. TSIU 113 and PSU 114, respectively, provide circuited and packet switched connections to and from the associated station 11 under control of control unit 111.

Switching module 120 includes an analog line unit (ALU) 122 which terminates conventional analog lines, e.g., 24, and provides access to a TSIU 123. TSIU 123 provides circuit-switched connections to and from the associated stations 23 under control of control unit 121. Switching module 130 is similar to switching modules 110 and 120, but includes the appropriate analog or digital trunk unit (not shown) for interfacing with the outgoing trunk included in communication path 26 to switch 200.

Each analog station set communicates with switch 100 on one or more tip-ring pairs as is known in the art. In a first exemplary embodiment of this invention, an analog line 24 is used for connecting answering machine 21 to ALU 122, as is known in the art. A further analog line 22 connects answering machine 21 to telephone station set 23. In a second exemplary embodiment of this invention, a voice messaging system 40 is connected to switch 100 through multiline hunt group lines 41. For each line of a member of a multiline hunt group 41, the switch attempts to connect a new call to each line sequentially until an idle line is located, as is known in the art.

A third exemplary embodiment of this invention discloses an ISDN station set which provides a voice messaging system with voice activated prompt interrupt. An ISDN station communicates with switch 100 in 64 kilobits per second channels, referred to as B-channels, and in one 16-kilobits per second channel referred to as a D-channel. Each of the B-channels is usable to convey digitized voice samples at the rate of 8,000, 8-bit samples per second or data at a rate of 64 kilobits per second. The D-channel is used both to convey signaling packets to effect message signaling between ISDN stations and switching module control unit and to convey data packets between different ISDN stations.

In the third exemplary embodiment, information is conveyed between ISDN station 11 and switch 100, using a 4-wire, digital subscriber line (DSL) 12, using one pair of wires for each direction of transmission. DSL 12 transmits a serial bit stream at the rate of 192 kilobits per second, which comprises 144 kilobits per second, for the above-mentioned two 64 kilobits per second B-channels and one 16 kilobits per second D-channel and which further comprises 48 kilobits per second used for a number of functions including framing, DC balancing, control and maintenance. DSL 12 represents what is referred to by International Telegraph and Telephone Consultative Committee (CCITT) as the T-interface. The use of the T-interface is only exemplary, however, as the invention is equally applicable to systems using other access methods.

Signaling packets are conveyed between ISDM stations and the switching module control units enclosed in level 2 (link-level) frames, for example, in accordance with the standard Link Access Protocol D (LAPD). The exemplary signaling message used for the control of circuit-switched calls are in accordance with CCITT recommendation Q.931.

Communications module 150 includes a time-shared space-division switch or time-multiplexed switch, that provides 64 kilobits per second circuit switched paths between switching modules. It supports B-channel traffic between switching modules as well as packet traffic between PSUs in different switching modules. The switching module control unit provides call processing and overall control and maintenance functions for the switching module. Switching module control units in different switching modules communicate with others and with the administrative module 160 through a message switch (not shown) in communications module 150 using an internal message protocol. The architecture provides flexibility in placing specific processing functions in specific processing elements. The general strategy is to place much of the required processing capability in the switching module control units, but to reserve the module for those functions that are inherently centralized. The call processing functions can, for example, be distributed in a number of ways. In one alternative, most of the call processing functions are placed in the switching module control units with routing, terminal hunting, and path hunt functions located in the administrative module. In another alternative, all call processing functions are placed in the switching module control units, with the administrative module reserved for truly administrative processing.

To complete the description of FIG. 1, switch 200 is shown connected to a conventional analog station 201, used for purposes of illustration, as the originating station in the examples described herein. The architecture of switch 200 and the types of stations served by switch 200 are not important to the present invention and are thus not described further.

A voice messaging system with voice activated prompt interrupt may be achieved in a first embodiment in connection with answering machine 21. Answering machine 21 is connected to switch 100 by an analog subscriber line 22 comprising a tip-ring pair, and connected to telephone station set 22 by an analog tip ring pair 23, as is known in the art. Answering machine 21, as will be described more fully below in connection with FIG. 4, includes a recording device, a telephone network interface, an outgoing prompt, an echo canceler, a speech detector, a recording buffer, a recording device and a processor. The telephone network interface is connected to the incoming tip ring pair 24 as is known in the art. The telephone network interface provides control of the connection to the network for answering machine 21 and telephone 23. The telephone network interface is controlled by the processor. When the telephone network interface indicates to the processor that it is receiving a ringing signal from switch 100, the processor controls the telephone network interface to give an off-hook indication to switch 100 and then causes the outgoing prompt to begin its message. The outgoing prompt may be a tape playback device or a solid state memory with a prerecorded message, as is known in the art.

A known problem in the telephone network is that signals from a source such as answering machine 21 to telephone 201 (FIG. 1) for example, will be reflected back to answering machine 21. This reflection is commonly called "echo". If answering machine 21 merely detected incoming speech, it would detect the echo of its own prompt, and start recording. Therefore, a certain amount of echo cancellation is performed in the preferred embodiment of this invention.

To this end, simultaneously with starting the outgoing prompt, the processor in the answering machine causes both the outgoing prompt and the incoming signals to be placed in an echo canceler. As will be described in more detail below, the echo canceler generates an echo estimate and subtracts the echo estimate from the incoming signal. The resulting signal is sent to a speech detector. If speech is present, the speech detector informs the processor, which turns off the prompt and starts a recording device.

Alternatively, the voice messaging system with voice activated prompt interrupt may be implemented in a voice mail system 40, as will be described in more detail in connection with FIG. 5. Voice mail system 40 may be a large system, such as the AUDIX voice messaging system as described in the AUDIX user documentation, both available from AT&T. The voice mail system is connected to switching system 100 through voice links 41 and a control link such as an AT&T DCUI protocol link as is conventional and described in U.S. Pat. Nos. 4,646,346 and 4,612,416. Voice links 41 carry voice channels, and are in the conventional multiline hunt group format. Voice links 41 are coupled to voice ports 42 of system 40. Interface 43 translates between the protocol used on data link and a protocol or format that is understood or used entirely by the voice messaging system. Translators of this nature are well-known in the art. Operation of an illustrative voice mail service system and its interface with a PBX are described in U.S. Pat. No. 4,790,003, which issued to Kepley et. al., on Dec. 6, 1988.

When an incoming call to the voice messaging system from telephone 201, for example, arrives at switch 100, it is routed from switch module 130 through communications module 150 and to switch module 120. Control unit 121 causes ALU 122 to connect the call to one of the available lines in multiline hunt group 41 to voice mail system 40. At the same time, a message is sent from switch 100 to voice mail system 40 indicating an incoming call and the line 41 that the call is on. Voice mail system then completes a connection to one of the multiline hunt group 41 lines and signals that the call connection is complete.

The voice messaging system begins an audible prompt, derives an echo estimate, subtracts the echo estimate from incoming signals to generate an enhanced incoming signal and monitors externally generated incoming speech, as above. Once incoming speech is detected, the prompt is stopped and the recording of the incoming voice begins.

Alternatively, the voice messaging system with voice activated prompt interrupt may be implemented digitally, as will be described in more detail in connection with FIG. 6. This alternative embodiment will be described in connection with ISDN telephone 11, but it will be apparent to one skilled in the art that the following description could apply with little modification to non-ISDN telephone systems. In this embodiment, ISDN telephone 11 is connected to computer 13 and to switch 100. When a call arrives from telephone 201, for example, normal call processing steps occur, as known in the art. After a predetermined time or, alternatively, if the called party is talking on another call, ISDN telephone 11 may begin an audible prompt on one of the B-channels, begins the process of determining the echo estimate and monitors for incoming speech, as above. In response to speech being detected, ISDN telephone 11 stops the prompt and begins recording the speech message.

Figure 2:
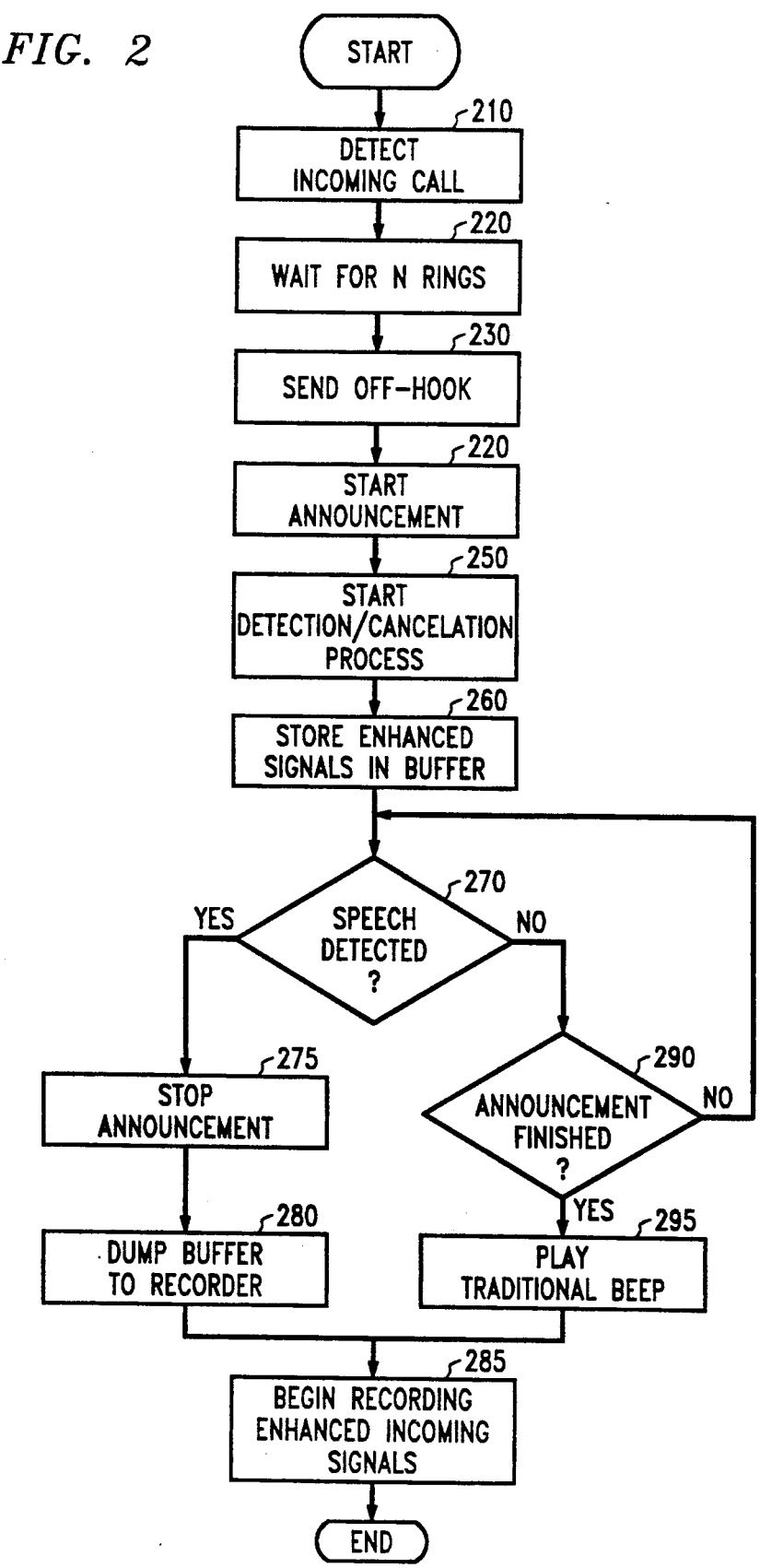
FIG. 2 is a flow chart of the control of network compensation, the prompt and the recording device of the preferred embodiment of this invention.

The operation of the voice messaging system with voice activated prompt interrupt will now be stated in connection with the flow chart of FIG. 2. In response to a signal from the telephone network interface indicating a detection of ringing, or, alternatively, a message indicating an incoming call in box 210, a processor in the voice storage system in box 220 waits for N rings, where N is a positive integer, which in the preferred embodiment is usually equal to or greater than 3. Next, in box 230, an off-hook signal is sent to switch 100, causing completion of a connection through the network.

Next, the voice messaging system executes program instructions defined by box 240 and causes the outgoing prompt to be transmitted. Next, in box 250, the voice messaging system starts the detection/cancellation process. In this process, an echo estimate of the prompt message is derived and subtracted from the incoming signal, thus developing an enhanced signal. The enhanced signal is examined for speech signals, as will be described below in connection with FIG. 3. Next, in box 260 enhanced signals are moved into a circular FIFO buffer for temporary storage. Since at least several milliseconds are required to detect incoming speech signals, the circular buffer with several milliseconds capacity is used to store the incoming signals in case speech is detected, so that the first few milliseconds of the speech signal are not lost.

In decision diamond 270, a determination is made if speech is detected. If speech is detected, processing proceeds to box 275 where the announcement is stopped, and then processing proceeds to box 280 where the circular buffer is dumped into the recorder.

Next, in box 285, all incoming signals are recorded. If speech is not detected in decision diamond 270, a determination is made in decision diamond 290 whether the announcement is finished. If the announcement is not finished, processing proceeds back to decision diamond 270. If the announcement is finished in decision diamond 290, processing proceeds to box 295 where the traditional beep is given over the network. Processing then continues to box 285 where incoming signals are recorded.

Figure 3:
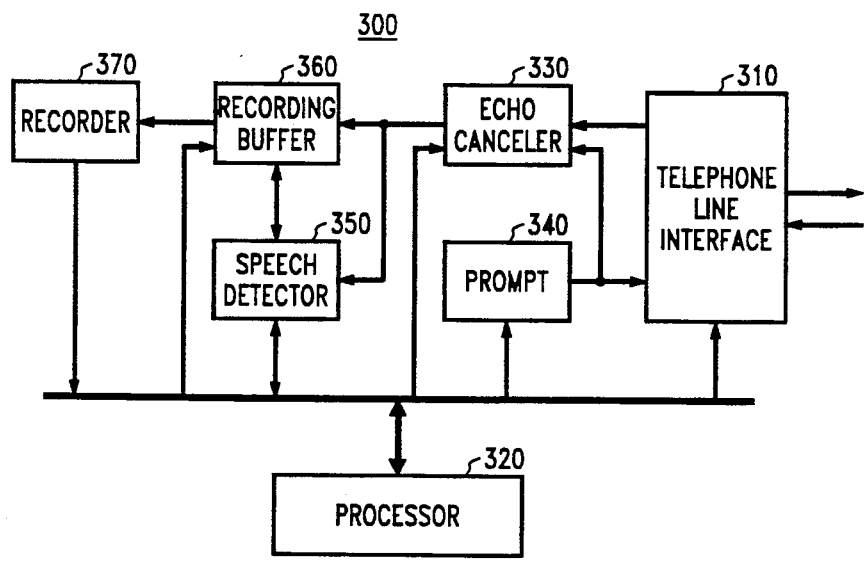
FIG. 3 is a functional block diagram of control of a voice activated prompt interrupt according to the exemplary embodiments of this invention as shown in the three embodiments in FIG. 1.

FIG. 3 shows a block diagram of the speech detection/compensation process. Box 310 generally denotes a telephone line interface. In the preferred embodiment of this invention, the telephone line interface gives on-hook/off-hook signals and provides a digital representation of the incoming signal, as is known in the art. Telephone line interface 310, according to this invention, could comprise a codec or similar analog to digital converter. In a purely digital system, the telephone line interface 310 would comprise a signal splitter/combiner. Telephone line interface 310 also comprises a means for giving an off-hook signal to the network, as is known in the art.

An indication of a call comes in from switch 100 to interface 310. Interface 310 notifies processor 320, and, after three or more rings, processor 320 causes interface 310 to give an off-hook indication to switch 100. Next, processor 320 causes echo canceler 330 to reset and causes prompt 340 to begin delivering a prompt message to the network and to echo canceler 330. As stated above, one or more reflections of the prompt signal may be added to other incoming signals, due to the nature of the telephone network. Advantageously, such reflections, commonly called "echo", should be removed for optimal detection and recording of incoming speech signals.

Echo canceler 330 adapts to the echo of the prompt message from the network during intervals of no incoming speech by filtering the prompt message delivered directly from prompt 340 to approximate the echo of the prompt message in the incoming signal delivered through interface 310. Echo canceler 330 internally generates an echo estimate of similar delay, frequency, amplitude and phase characteristics, and substracts the echo estimate from the incoming signal to generate an enhanced incoming signal. Such adaptation, as stated above, is continuous, because it has been empirically determined that the network changes over the duration of a prompt message, and therefore echo characteristics change over this time.

Next, echo canceler 330 delivers the enhanced incoming signal to speech detector 350 and to recording buffer 360. Speech detector 350 in the preferred embodiment of this invention monitors the enhanced incoming signal to determine if the level of speech in the signal exceeds a predetermined amplitude threshold for a predetermined frequency band for a predetermined amount of time. If the incoming signal exceeds the predetermined thresholds, speech signals may be present. In this manner, if the incoming signals are of short duration, indicating a pop or click on the line, or a long, steady tone, indicating a modem or similar device, they can be ignored. Alternatively, speech detector 350 may analyze the spectrum of the incoming signal for detection of speech.

Enhanced incoming signals are also delivered to recording buffer 360. Recording buffer 360 holds samples of the enhanced incoming signals in a circular FIFO buffer as is known in the art, for a predetermined time. Since detection of speech takes a period of time, a first part of the speech would be lost if the recorder were turned on when speech is detected. Therefore, once speech is detected, the content of buffer 360 is delivered to recorder 370, and then normal sample by sample recording begins. Processor 320 also turns off prompt 340 when speech is detected.

If no speech were detected and prompt 340 completes the prompt message, processor 320 applies a "beep" tone to the line and starts recorder 360.

Figure 4:
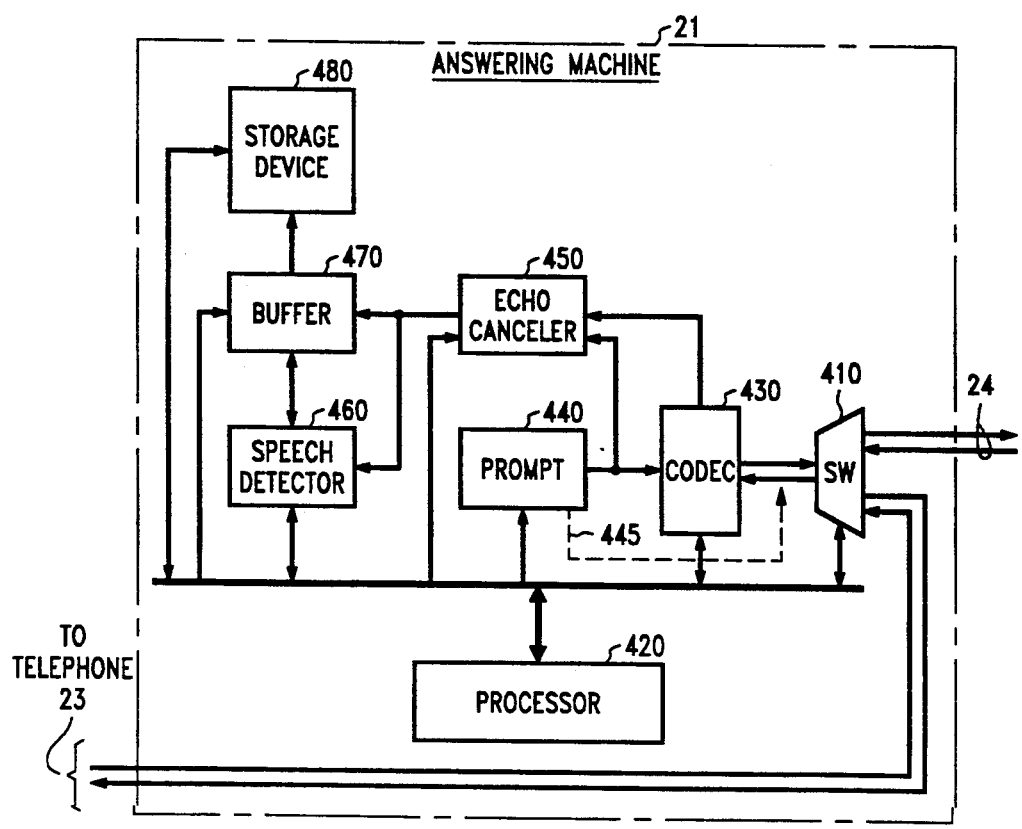
FIG. 4 is a block diagram of an answering machine according to a first exemplary embodiment of this invention, as shown in FIG. 1, incorporating the voice activated prompt interrupt feature.

A first embodiment will now be described in connection with an answering machine 21 in FIG. 4. Answering machine 21 of this embodiment of this invention is connected to the network by way of an analog line, comprising tip-ring pair 24, as is known in the art. Line 24 connects to a switch 410 in answering machine 21, which also connects line 24 to telephone 23, as is known in the art. When ringing is detected on line 24, switch 410 informs processor 420, and processor 420, after a predetermined time or number of rings, causes switch 410 to give an off-hook appearance to the network. Incoming signals are then delivered to codec 430 where they are converted from analog into a digital bit stream, as known in the art. Processor 420 then causes audible prompt 440 to operate, which sends an audible speech signal to line 24 and into the network. At the same time, the prompt message is delivered to echo canceler 450. Prompt 440 may be a simple tape device, as is known in the art, or may also be a synthesized or recorded voice stored in RAM or ROM. If prompt 440 is a tape device, prompt 440 sends signals to switch 410 via line 445, bypassing codec 430.

At the same time as the operation of prompt 440, processor 420 causes digital samples from codec 420 of the incoming signal to be sent to echo canceler 450. Echo canceler 450 calculates an echo estimate and subtracts the echo estimate from the incoming signal, as described above in connection with FIG. 3, and generates an enhanced incoming signal. The enhanced incoming signal is then sent to speech detector 460 and to memory buffer 470.

If speech detector 460 detects speech signals, it notifies processor 420. Processor 420 causes memory buffer 450 to send the saved enhanced incoming signals to a storage device 480. Storage device 480 may be another simple tape recording device, as is common in answering machines, plus a digital to analog converter, or may be a fully digital storage memory, as shown in FIG. 4.

Figure 5:
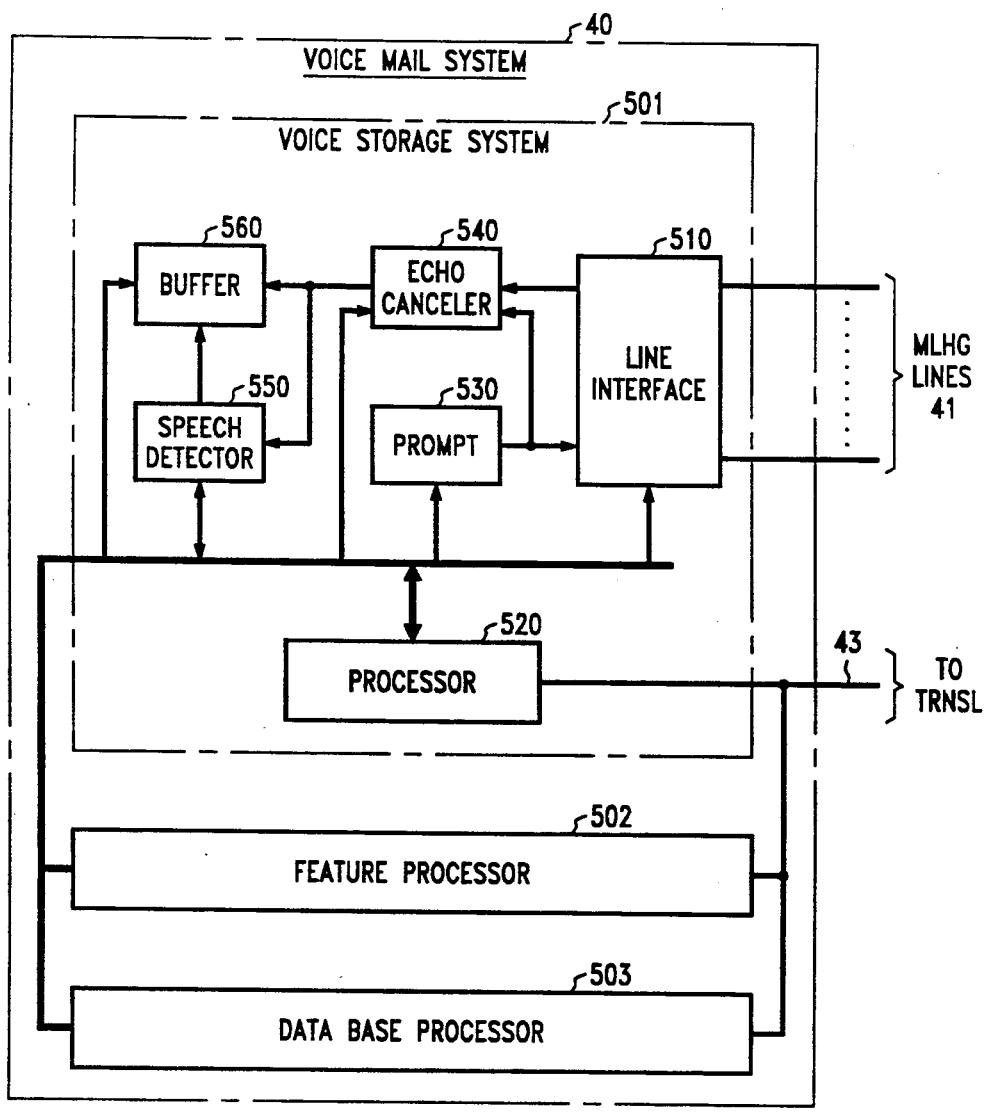
FIG. 5 is a block diagram of a voice messaging system according to a second exemplary embodiment of this invention, as shown in FIG. 1, incorporating the voice activated prompt interrupt feature.

A second embodiment will now be described in connection with a voice mail system 40, as illustrated in FIG. 5. Voice mail system 40 of this embodiment of this invention is connected to switch 100 via analog or digital lines 41, connected in a multiline hunt group configuration. There is also a connection between the voice mail system 40 and the administrative module of switch 100, via line 43. There are three main processors in voice mail system 40 of this embodiment of this invention, voice storage system 501, feature processor 502 and data base processor 503. For purposes of describing this embodiment of this invention, only voice storage system 501 will be discussed, and only those features added by this invention will be described. For a more complete discussion of voice mail system 40, refer to U.S. Pat. No. 4,790,003, which is incorporated by reference. When a call comes in to voice mail system 40 on one of the multiline hunt group lines 41, a message is sent over interface 43 to processor 520. After, for example, three or more rings, processor 520 causes one of the line interface units to give an off-hook appearance to the incoming line. Processor 520 next causes the system prompt 530 to begin delivering the outgoing prompt message to the network and to echo canceler 540. Processor 520 also causes incoming signals from the network to be delivered to echo canceler 540. Echo canceler 540 generates an echo estimate and subtracts the echo estimate from the incoming signal to derive an enhanced incoming signal. The enhanced incoming signal is delivered to a speech detector 550 and a circular buffer 560, as described above in connect with FIG. 3. When speech is detected, processor 520 stops the prompt 530 and causes the content of buffer 560 to be delivered to data base processor 503. Data base processor 503 stores the voice signals according to the description given in U.S. Pat. No. 4,790,003, as cited above.

Figure 6:
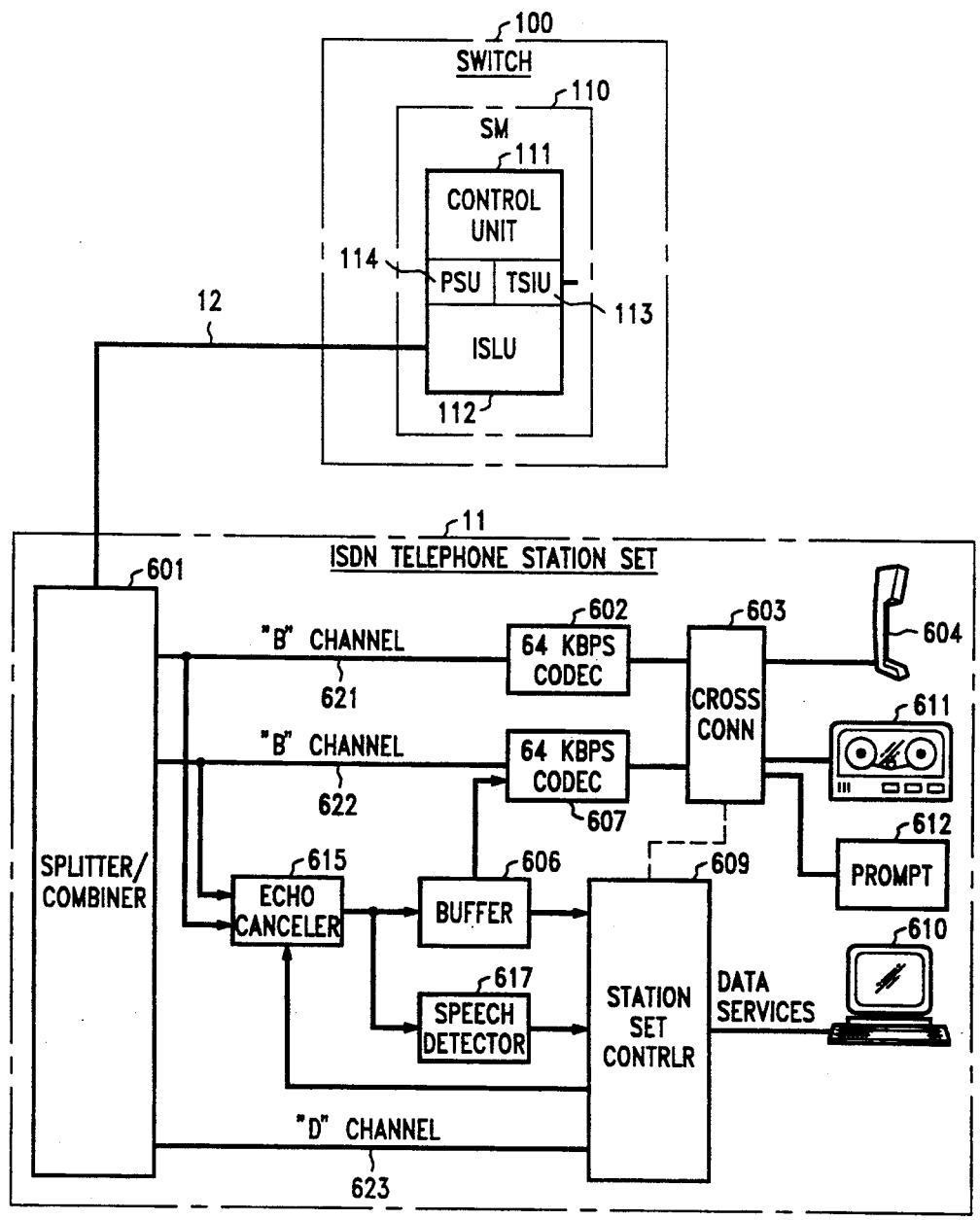
FIG. 6 is a block diagram of an Integrated Switched Digital Network (ISDN) telephone station set and an ISDN switching system according to a third exemplary embodiment of this invention, as shown in FIG. 1, incorporating the voice activated prompt interrupt feature.

FIG. 6 is a block diagram of an ISDN telephone station set, incorporating a voice messaging system with voice activated prompt/interrupt. The two B-channels and the D-channel on digital subscriber line 12 are demultiplexed onto separate paths 621, 622, and 623 by a splitter-combiner 601. In the present illustrative embodiment, both of the 64 kilobits per second B-channels on paths 621 and 622 are used for conveying digitized speech signals. The digital signals are converted to analog speech signals by a 64 kilobit per second coder/decoder (codec 602) and are transmitted to a receiver of handset 604 for audible speech reception. In the reverse direction, the analog speech signals generated from audible speech by the transmitter of handset 604 are transmitted for coding by codec 602 into a 64 kilobit per second digitized speech signal on path 621. The B-channel, or path 621, is multiplexed onto DSL 12 by splitter/combiner 601.

In the present embodiment, the 64 kilobits per second B-channel on path 622 is used for providing a voice messaging system with voice activated prompt interrupt when B-channel 621 is busy. The D-channel on path 623 is used for user packet data and for communication between station set controller 609 and control unit 111 (FIG. 1).

The operation of ISDN station 11 for voice messaging system with voice activated prompt interrupt will now be described. For example, a call is connected on B-channel 621 to handset 604. If another call arrives at switch 100 for ISDN station set 11, switch 100 sends a message to station set controller 609 through D-channel 623. Station set controller 609 causes an off-hook appearance to be given to B-channel 622 and causes prompt 612 to deliver the outgoing prompt message to B-channel 622 through cross connect switch 603. Echo canceler 615 receives both incoming signals and outgoing prompt signals, and perform the subtraction operation as described above in connection with FIG. 3. The enhanced incoming signal is delivered to a speech detector 617 and to a buffer 613 as before.

If speech is detected, speech detector 617 notifies station set controller 609 which causes the content of buffer 613 to be delivered to recording device 611. In this embodiment of this invention, recording device 611 is an analog tape device, therefore the enhanced incoming signal is delivered via codec 607 and cross connect 611.

Alternatively, station set controller 609 could buffer incoming data in data buffer 606 and deliver enhanced incoming signals to computer 610 for storage and later retrieval.

It is to be understood that the above-described embodiments are merely illustrative principles of the invention and that many variations may be devised by those skilled in the art, without departing from the scope of the invention. It is, therefore, intended that such variations be included within the scope of the claims.

We claim:

1. A system for providing voice-activated prompt interrupt comprising
   responsive to receipt of an incoming call, transmitting a prompt message,
   receiving incoming speech signals during said transmitting of said prompt message,
   enhancing said incoming speech signals,
   buffering said enhanced incoming speech signals in a storage buffer and a detection buffer,
   determining whether the energy of said enhanced incoming speech signals in said detection buffer exceeds a predefined threshold, and
   taking further action using said incoming speech signals in said storage buffer in response to determining that the energy of said incoming speech signals exceeds a predefined threshold.

2. A system in accordance with claim 1 wherein said taking further action comprises recording said incoming speech signal, starting with said incoming speech signals in said storage buffer.

3. A system in accordance with claim 1 wherein said taking further action comprises stopping said prompt message.

4. A system in accordance with claim 1 wherein said predefined threshold comprises a predetermined threshold for a predetermined frequency band.

5. A system in accordance with claim 1 wherein said predefined threshold comprises a predetermined duration of a predetermined amount of energy.

6. A system in accordance with claim 1 wherein said predefined threshold comprises a predetermined threshold for a predetermined frequency band for a predetermined duration.

7. A system in accordance with claim 1 wherein said incoming signals are enhanced by an echo canceler.

8. A system in accordance with claim 7 wherein said incoming signal includes an echo of said prompt message, said echo canceler developing said enhanced incoming signals by receiving a representation of said prompt message, generating an echo estimate of said prompt message and subtracting said echo estimate from said incoming signal.

9. A method of providing a voice-activated prompt interrupt feature for a voice messaging system connected to a telephone network, said voice messaging system comprising a prompting device, an echo canceler, a speech detector, a buffer and a recording device, all under the control of a processor, said method comprising
   responsive to receipt of an incoming call and the absence of an answer signal from a destination, said prompting device transmitting prompt message signals to said telephone network and to said echo canceler,
   delivering incoming signals from said telephone network to said echo canceler,
   developing an echo estimate using said prompt in said echo canceler,
   enhancing said incoming signals in said echo canceler by subtracting said echo estimate from said incoming signal,
   delivering said enhanced incoming signals to said speech detector and to said buffer,
   if said speech detector detects that said enhanced incoming signals are speech signals, said speech detector notifying said processor,
   said processor starting said recording device and stopping said prompt when said incoming signal includes speech signals and transferring said enhanced incoming signals stored in said buffer to said recording device.

10. A telephone answering machine comprising:
    interface means for interfacing said answering machine to a telephone network, prompt means connected to said interface means for transmitting outgoing signals to said network,
    signal enchancing means connected to said interface means and said prompt means for receiving incoming signals and developing an enhanced incoming signal,
    speech energy detection means receiving said enhanced incoming signal for detecting if said enhanced incoming signal includes speech energy,
    buffer means for receiving said enhanced incoming signals and storing said enhanced signals,
    recording means connected to said buffer means for recording enhanced incoming signals, and
    processor means for controlling said answering machine so that when speech energy is detected by said detection means, said processor means stops said prompt means and starts said recording means.

11. A telephone answering machine in accordance with claim 10 wherein said buffer means comprises a circular, FIFO buffer.

12. A telephone answering machine in accordance with claim 10 wherein said signal enhancing means comprises an echo canceler.

13. A telephone answering machine in accordance with claim 12 wherein said echo canceler enhances said incoming signal by determining an echo estimate and subtracting said echo estimate from said incoming signal.

14. A telephone answering machine in accordance with claim 13 wherein said prompt means also delivers said outgoing signals to said echo canceler, and said echo canceler determines said parameters of echo by calculating the delay, frequency and amplitude of the echo.

15. A telephone answering machine in accordance with claim 14 wherein said echo canceler continually determines said parameters of echo when speech energy is not detected.

16. A voice mail system comprising
    interface means for interfacing said voice mail system to a multiline hunt group from a switching system,
    prompt means connected to said interface means for transmitting outgoing signals to said network,
    signal enhancing means connected to said interface means for receiving incoming signals and developing an enhanced incoming signal,
    speech energy detection means receiving said enhanced incoming signal for detecting if said enhanced incoming signal includes speech energy,
    buffer means for receiving said enhanced incoming signals and storing said enhanced signals, recording means connected to said buffer means for recording enhanced incoming signals, and processor means for controlling said voice mail system so that when speech energy is detected by said detection means, said processor means stops said prompt means and starts said recording means.

17. A voice mail system in accordance with claim 16 wherein said buffer means comprises a circular, FIFO buffer.

18. A voice mail system in accordance with claim 16 wherein said signal enhancing means comprises an echo canceler.

19. A voice mail system in accordance with claim 18 wherein said echo canceler enhances said incoming signal by determining parameters of echo, creating an echo estimate using said determined parameters and subtracting said echo estimate from said incoming signal.

20. A voice mail system in accordance with claim 19 wherein said prompt means also delivers said outgoing signals to said echo canceler, and said echo canceler determines said parameters of echo by calculating the delay, frequency and amplitude of the echo.

21. A voice mail system in accordance with claim 20 wherein said echo canceler continually determines said parameters echo when speech energy is not detected.

22. An ISDN telephone station set, said ISDN telephone station set connected via a digital subscriber line comprising first and second B-channels and a D-channel to an ISDN switching system, said ISDN telephone station set comprising splitter/combiner means for digitally interfacing said first and second B-channels and said D-channel of said digital subscriber line with a first B-channel path, a second B-channel path and a D-channel path, respectively, a first coder/decoder for converting between digital voice signals received from said first B-channel via said splitter/combiner means and said first B-channel path and analog voice signals, a second coder/decoder for converting between digital voice signals received from said second B-channel via said splitter/combiner means and said second B-channel path and analog voice signals, audio means connectable to said first B-channel for audibly transmitting and receiving voice communication, recording means connectable to either said first B-channel or said second B-channel for recording voice messages, prompt means connected to said splitter/combiner means for transmitting outgoing signals to said network on either said first B-channel or said second B-channel, signal enhancing means connected to said first and second B-channels and said prompt means for receiving incoming signals and said outgoing signals, and developing an enhanced incoming signal, buffer means connected to said signal enhancing means and said recording means for storing said enhanced signal from said signal enhancing means, speech energy detection means connected to said signal enhancing means for receiving said enhanced signal and detecting whether said enhanced signal comprises speech energy, wherein when said speech energy detection means detects speech energy, said prompt means stops and said recording means starts and said buffer means delivers said stored enhanced signal to said recording means.

23. An ISDN telephone station set in accordance with claim 22 wherein said recording means comprises a digital recorder.

24. An ISDN telephone station set in accordance with claim 22 wherein said recording means comprises an analog tape recorder with a D/A converter connected to said buffer means.

25. An ISDN telephone station set in accordance with claim 22 wherein said prompt means comprises a digitally stored voice message.

26. An ISDN telephone station set in accordance with claim 22 wherein said prompt means comprises an analog tape recorder with prerecorded message interfaced to said B-channels via an A/D converter.

27. An ISDN telephone station set in accordance with claim 22 wherein said buffer means comprises a circular, FIFO buffer.

28. An ISDN telephone station set in accordance with claim 22 wherein said signal enhancing means comprises an echo canceler.

29. An ISDN telephone station set in accordance with claim 28 wherein said echo canceler develops and echo estimate using said prompt message and then develops said enhanced incoming signal by subtracting said echo estimate from said incoming signal.

30. An ISDN telephone station set in accordance with claim 29 wherein said echo canceler determines said parameters for the duration of said prompt message.

31. A system in accordance with claim 8 wherein said generating an echo estimate of said prompt message and substracting said echo estimate from said incoming signal occur until speech signals are detected.

* * * * *